UNITED STATES PATENT OFFICE

FRITZ STÖWENER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF INORGANIC ACTIVE MASSES

No Drawing. Application filed July 20, 1926, Serial No. 123,797, and in Germany July 21, 1925.

In the manufacture of inorganic active masses such as active silica, alumina and the like, not only granular products, but also large quantities of powdery and fine-grained material are obtained. These usually wasteful products can only be utilized for adsorbing bodies from liquid materials, whereas for the adsorption of gases and vapors, especially for drying gases, for catalytic reactions only coarse-grained, hard material can be employed in order to avoid a high resistance of the mass to gas or liquid passing therethrough. By pressing the powdery or fine-grained material a coarse-grained product with only a rather low mechanical strength is obtained.

I have now found that powdery or fine-grained inorganic active masses which in the dry state have a high adsorbing power for vapours, such as silica, alumina, and the like can be converted into shaped or granular products of great mechanical strength and high adsorbing power by mixing the fine-grained material with a binding agent and forming the mass or making it into grains, preferably with the aid of pressure. As binding agents colloidal materials such as sols, jellies, jelly-like precipitates of alumina, silica, ferric oxid and the like or mixtures thereof or any other materials to which by the action of pressure, drying or heat a porous, or what is more suitable ultra-porous, structure is imparted and which themselves form active masses, can be employed.

Particularly hard masses of high adsorbing power are obtained by producing the binding agent within the mass before, during or after the forming operation, for example by producing a paste of the fine-grained material with the aid of alkali metal silicate or caustic alkali solution and treating the mass before, during or after the forming operation with suitable agents such as acids, salt solutions, gases, superheated steam and the like. The forming operation need not be carried out with the aid of pressure, though it is advantageous to employ same. Prior to the treatment with acids or the like the mass may be dried or even heated to incandescence. By this manner of working a material can be produced, the pores of which are uniform in size, or which has pores of different orders of size.

The process according to my present invention has the great advantage that material of high activity which is of low value by reason of its small size, can be converted into material of high industrial value and that in the manufacture of inorganic active masses such as silica gel and the like no care need be taken to avoid the formation of dust-like by-products, so that time and work is saved.

The following example will further illustrate how my invention may be carried out in practice, but the invention is not limited to this example.

550 parts, by volume, of sodium silicate solution of 1.164 specific gravity are caused to run in the course of an hour into a mixture of 51 parts, by weight, of concentrated sulfuric acid, 46 parts, by weight, of ice and 60 parts, by volume, of water, while stirring well. Thereupon the mixture is heated at once while stirring, whereby at between 60° and 90° C. the sol sets to a homogeneous jelly, which is broken into pieces, preferably after standing for some hours, and washed for from 10 to 20 hours, until nearly all salts and acid impurities are removed from the jelly. It is advantageous to proceed with the purification not too long, as the presence of small quantities of acids (hydrogen ions) is of advantage for the formation of very small pores. The washing operation is preferably carried out with water which has been purified by distillation or by treatment with diatomaceous earth or active silica or both with a view to remove colloidal impurities. It is advantageous to increase the concentration of the hydrogen ions in the washing water by suitable additions such as acids. The jelly is then dried in a revolving furnace by direct contact with a counter-current of a mixture of air and combustion gases for example of producer gas or lignite briquets, the temperature being 150° C. at the entrance of the silica into the furnace and 460° C., where it leaves the furnace. After the mass has been passed 5 or 6 times through the furnace in the course of about an hour and a half, the resulting hard, strongly shrunk lumps are sieved. While the coarse lumps of active silica can be employed directly if desired after being strongly heated or glowed preferably in a current of air, 100 parts, by weight, of the powdery or fine-grained waste (the size of the grains being up to 1 millimeter) are made into a paste by means of 165 parts of sodium silicate solution of 1.125 specific gravity, which paste is pressed to a hard shaped body by exposing to a pressure of 550 atmospheres during 2 hours, dried if so desired, made into grains, treated with hydrochloric acid of between 10 and 20 per cent strength preferably while boiling, washed and dried. The hydrochloric acid resulting from the said treatment may be employed again and afterwards utilized for the preparation of jellies.

The process may also be carried out by drying the jelly obtained in the manner described above without subjecting it to purification, in a revolving or channel furnace at elevated temperatures, preferably between 120° and 500° C., washing it and converting the resulting fine-grained mass, if desired after making it into a fine dust, into formed bodies in the manner described above.

What I claim is:

1. The process of producing shaped inorganic active masses of a high adsorbing power and great mechanical strength which comprises making a fine-grained inorganic active mass which in the dry state has a high adsorbing power for vapours, into a plastic mass with an inorganic binding agent which itself forms an active mass, shaping the said plastic mass, drying the shaped bodies, acting thereon with an agent capable of converting the said binding agent into a state yielding, on drying, an adsorbent, washing and drying the shaped bodies.

2. The process of producing shaped inorganic active masses of a high adsorbing power and great mechanical strength which comprises making a fine-grained silica gel which in the dry state has a high adsorbing power for vapours, into a plastic mass with a silicate solution, shaping the said plastic mass, drying the shaped bodies, acting on the shaped bodies with an agent converting the silicate into active silica, washing and drying the shaped bodies.

3. The process of producing shaped inorganic active masses of a high adsorbing power and great mechanical strength which comprises making a fine-grained silica gel which in the dry state has a high adsorbing power for vapours, into a plastic mass with a water glass solution, shaping the said plastic mass with the aid of increased pressure, drying the shaped bodies, acting on the shaped bodies with in inorganic acid, washing and drying the shaped bodies.

4. The process of producing shaped inorganic active masses of a high adsorbing power and great mechanical strength which comprises making a fine-grained silica gel, which in the dry state has a high adsorbing power for vapours, into a plastic mass with a water glass solution, shaping the said plastic mass with the aid of increased pressure, acting on the shaped bodies with a 10 to 20 per cent solution of hydrochloric acid, washing and drying the shaped bodies.

In testimony whereof I have hereunto set my hand.

FRITZ STÖWENER.